July 22, 1941. H. W. SHANNON 2,250,440
OIL WELL FISHING TOOL
Filed Aug. 5, 1938 2 Sheets-Sheet 1
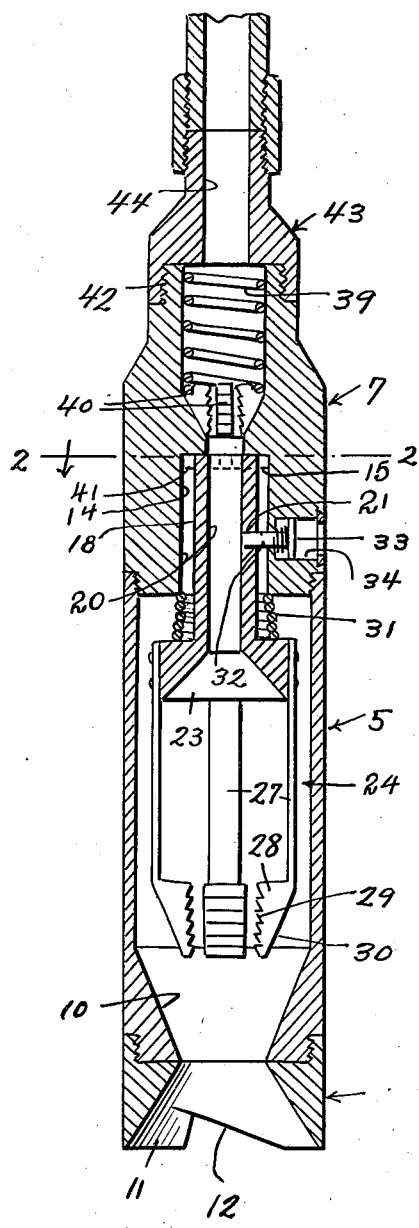
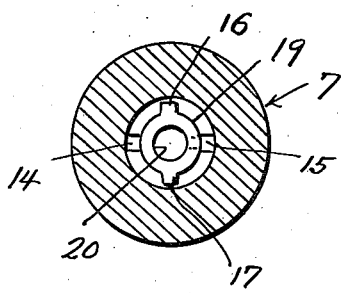
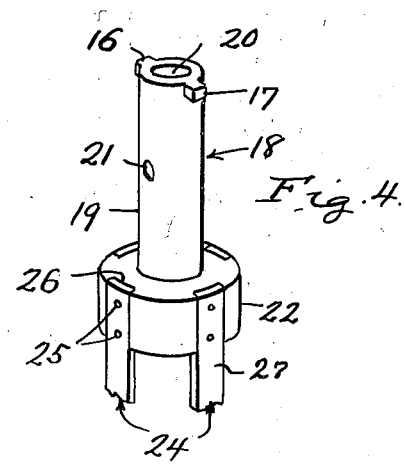
Inventor
Henry W. Shannon

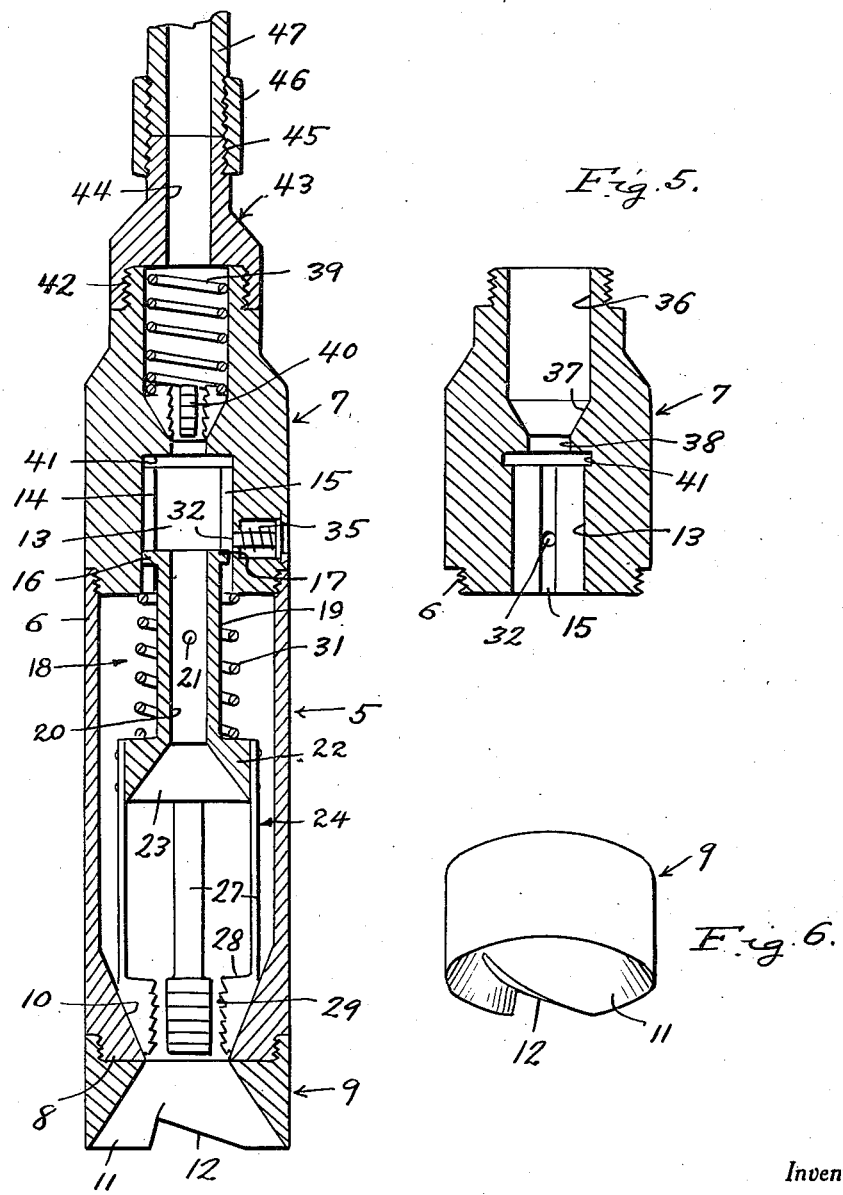

Patented July 22, 1941

2,250,440

UNITED STATES PATENT OFFICE 2,250,440

OIL WELL FISHING TOOL

Henry W. Shannon, Hominy, Okla.

Application August 5, 1938, Serial No. 223,350

3 Claims. (Cl. 294—102)

This invention relates generally to an oil well fishing tool, and particularly to improvements upon the subject matter of my prior Patent No. 2,094,419, granted September 28, 1937, and an important object of the present invention is to provide for—

(1) Fishing out the rods and the tubing all together at the same time, so as to eliminate the necessity for using different fishing tools for the rods and for the tubing, as are ordinarily necessary when the rods and the tubing are both lost in the well.

(2) Enabling breaking the hold of the fishing tool on the tubing without running the rods to break the hold, in the event that the lost tubing is fast, it being necessary only to let the weight of the tubing down on the fishing tool and turn the fishing tool of the present invention a fraction of a revolution to the left to break the hold.

(3) Enabling fishing both the rods and the tubing and drawing them out of the well together in cases where the rods are sticking above the tubing caught in the well, through the provision of a hole in the fishing tool to pass the rods, thereby eliminating the necessity to remove the rods separately which ordinarily hold the fishing tool off the tubing.

(4) Enabling easily connecting the fishing tool with tubing which has been dropped in the well and become bent or crooked and leaning against the side of the well wall, in a simple operation of turning the fishing tool of the present invention a part of a revolution toward the right upon its contact with the tubing.

Other important objects and advantages of the present invention will be apparent from a reading of the following description taken in connection with the drawings, wherein for purposes of illustration I have shown a preferred embodiment of my invention.

In the drawings—

Figure 1 is a general transverse vertical sectional view taken through the embodiment and showing the fishing tool in contracted position.

Figure 2 is a horizontal sectional view taken through Figure 1 approximately on the line 2—2 and looking downwardly in the direction of the arrows.

Figure 3 is a view similar to Figure 1 but showing the fishing tool in expanded position.

Figure 4 is a perspective view of the upper part of the slip hanger.

Figure 5 is a transverse vertical sectional view showing the head of the tool with the working parts removed.

Figure 6 is a perspective view of the shoe.

Referring in detail to the drawings, the numeral 5 generally designates the hollow cylindrical shell of the tool which is threaded at its upper end to receive the reduce threaded portion 6 on the head 7 which is externally threaded on its lower end to provide the reduced externally threaded portion 8 to thread into the top of the shoe 9. The lower part of the interior of the shell 5 has the tapered annular wall 10 to act in conjunction with the angulated radially outward faces of the slips to be described.

The shoe 9 has the frustro-conical opening 11 which opens therethrough, the smaller top thereof coinciding with the opening in the bottom of the shell 5. This opening 11 has a sloping narrow ledge 12 which starts at the outer edge of the shoe and goes about one-third of the distance around the inside of the shoe and tapers to an end, for the purpose of guiding the tubing past the cut out in the shoe.

The head 7 is a generally cylindrical block having opening through its lower part the uniformly cylindrical bore 13 which is formed with diametrically opposite vertical slots 14 and 15 to slidably receive the lugs 16 and 17 on the upper part of the slip hanger which is generally designated 18. The slip hanger 18 comprises the tubular part 19, which has a bore 20 large enough in size to pass the rods with the lugs 16 and 17 located adjacent its upper end and the latch bolt receiving hole 21 which is located at a point 90 degrees from the lugs. On the lower end of the tube 19 is the enlargement 22 which is located in the shell 5 below the head 7 and has a frusto-conical opening 23 with the small end up and slips 24 secured by means generally designated 25 in slots 26 formed in the peripheral edge of the enlargement 22. The slips 24 have the shanks 27 on the lower end of which are the jaws 28 which have the ratchet toothed inner surface 29 and the slanting outer surface 30 for cooperation with the tapering shoulder 10 in the lower end of the shell 5. A helical spring 31 is circumposed on the part 19 of the slip hanger and works between the top of the enlargement 22 and the bottom of the head 17 so as to ordinarily depress the slip hanger in the manner illustrated in Figure 3 of the drawings when the latch bolt 32 is disengaged from the receiving hole 21 as indicated in Figure 3 of the drawings.

The latch bolt 32 comprises a head 33 which works in a radial recess 34 in the side of the head 7 and carries the latch bolt 32 extending through a conforming opening in the inner end of the recess 34 for engagement with the hole 21 in the slide hanger tube 19. A retracting spring 35 interposed between the head 33 and the inner wall of the opening 34 normally maintains the latch in the position shown in Figure 3, from which disengaged position the latch may be manually pushed into the position shown in Figure 1. In the up or released position of the slip hanger 18, it may be held in such position independently of the latch 32 by rotating the slip hanger so as to move the lugs 16 and 17 out of the vertical slots 14 and 15 and into the groove 41. To release the slip hanger 18 from this position it is rotated so as to again bring the lugs 16 and 17 into the upper ends of the slots 14 and 15, down along which the lugs can then move.

Opening through the top of the upper part of the head 7 is a uniformly cylindrical bore 36 whose lower end is tapered as indicated by the numeral 37 to a reduced diameter portion 38 which opens into the top of the bore 13 and is concentric therewith, and in this bore 36 is located a helical spring 39 which substantially fills the bore in expanded condition and which presses downwardly on circumferentially spaced jaws 40 which are shaped and arranged similarly to the jaws 28 of the slip hanger and work in conjunction with the tapered bore portion 37. A groove 41 is cut in the top of the bore portion 13, said groove communicating with the upper ends of the slots 14 and 15 already described.

Threaded on a reduced upper portion 42 on the head is the cap 43 which has a bore 44 sufficiently large to pass the rods, and this cap has the reduced exteriorly threaded upper portion 45 to accommodate the connection 46 of the pipe 47.

To release the fishing tool from a retrieved pipe, it is only necessary to press downwardly on the head 7 until the slip hanger goes up into the head 7 and then to press lightly with the thumb on the latch head 33 and to hold the latch in while turning the head to a position whereat the pin is received in the hole 21 in the slip hanger, whereat the operator may take the fishing tool off the retrieved pipe or tubing by hand.

Although I have shown and described herein a preferred embodiment of my invention, it is to be definitely understood that I do not desire to limit the application of the invention thereto, and any change or changes may be made in the structure and arrangement of the parts, within the spirit of the invention and the scope of the subjoined claims.

Having described the invention, what is claimed as new is:

1. A fishing tool comprising a tubular body having a shoe on its lower end, said shoe being formed with an upwardly tapering opening for simultaneously receiving and centering well tubing and rods, said opening being formed with a cut-out in one side thereof, said opening being further formed with a sloping ridge starting at a radially inward point and terminating at a radially outward point adjacent said cut-out for carrying the rod and/or tubing past said cut-out.

2. A fishing tool for the simultaneous recovery of related sections of lost sucker rod and drill pipe, said fishing tool comprising a body having a shoe on its lower end for hooking the rod and the drill pipe, said body being tubular and having a relatively large bore having a taper at its lower end, a head on the upper end of said body formed with a relatively small bore formed entirely therethrough and through which the portion of the hooked sucker rod extending above the hooked drill pipe is adapted to pass, the bore of said head having an internal flange intermediate the upper and lower ends thereof and tapered on its upper side, the opening in said flange being only sufficiently large to pass the sucker rod, circumferentially arranged wedge grips operating in the bore above and on the tapered upper side of said flange, spring means urging said grips downwardly to grip the sides of the rod in engagement with said grips, and slip hanger means, said slip hanger means comprising a portion operating in the said bore of the head below said flange, said slip hanger means comprising another portion located within the bore of said body, said portion comprising a tube to slide longitudinally on and be guided by the hooked body and wedge slips depending from said tube and working on the taper at the lower end of the bore of said body, and spring means urging said slip means downwardly to work the slips on said taper and cause said slips to grip the sides of the hooked drill pipe, whereby withdrawal of the tool from the well recovers both the sucker rod and the drill pipe at the same time.

3. A fishing tool comprising a body having a shoe on its lower end for hooking lost sucker rod and drill pipe, a head on the upper end of said body, said body being formed with a relatively large bore having a taper at its lower end and said head being formed with a relatively small bore extending entirely through said head to accommodate the portion of the sucker rod extending above the lost drill pipe, an intermediate flange in the bore in the head, slip hanger means, said slip hanger means comprising an upper tubular portion arranged to slide along and be guided by the sucker rod extending therethrough and through the bore in said head, said tubular portion working in the bore of the head below said flange, lateral lugs on said tubular portion engaging in vertical slots formed in the side walls of the bore in the head below said flange, the bore of said head being formed with a horizontal annular groove into which the upper ends of said slots open and into which the said lugs can be rotated to hold said tubular portion in its elevated position, said slip hanger means further comprising an enlargement on the lower end of said tubular portion located within the bore of said body, said enlargement having a flaring bore positioned to guide the sucker rod into the bore of said tubular portion, normally expanded wedge slips depending from said enlargement, spring means working between said head and the top of said enlargement for urging said slip hanger means in a downward direction to apply said wedge slips to said taper to force said slips to grip the sides of the hooked drill pipe, said tubular portion being formed with a radial hole in the side wall thereof, and a radially movable latch carried by said body for engagement in said radial hole.

HENRY W. SHANNON.